Nov. 10, 1959  G. JAVOR  2,912,071
SAFETY BRAKE CONSTRUCTION
Filed March 28, 1957  2 Sheets-Sheet 2

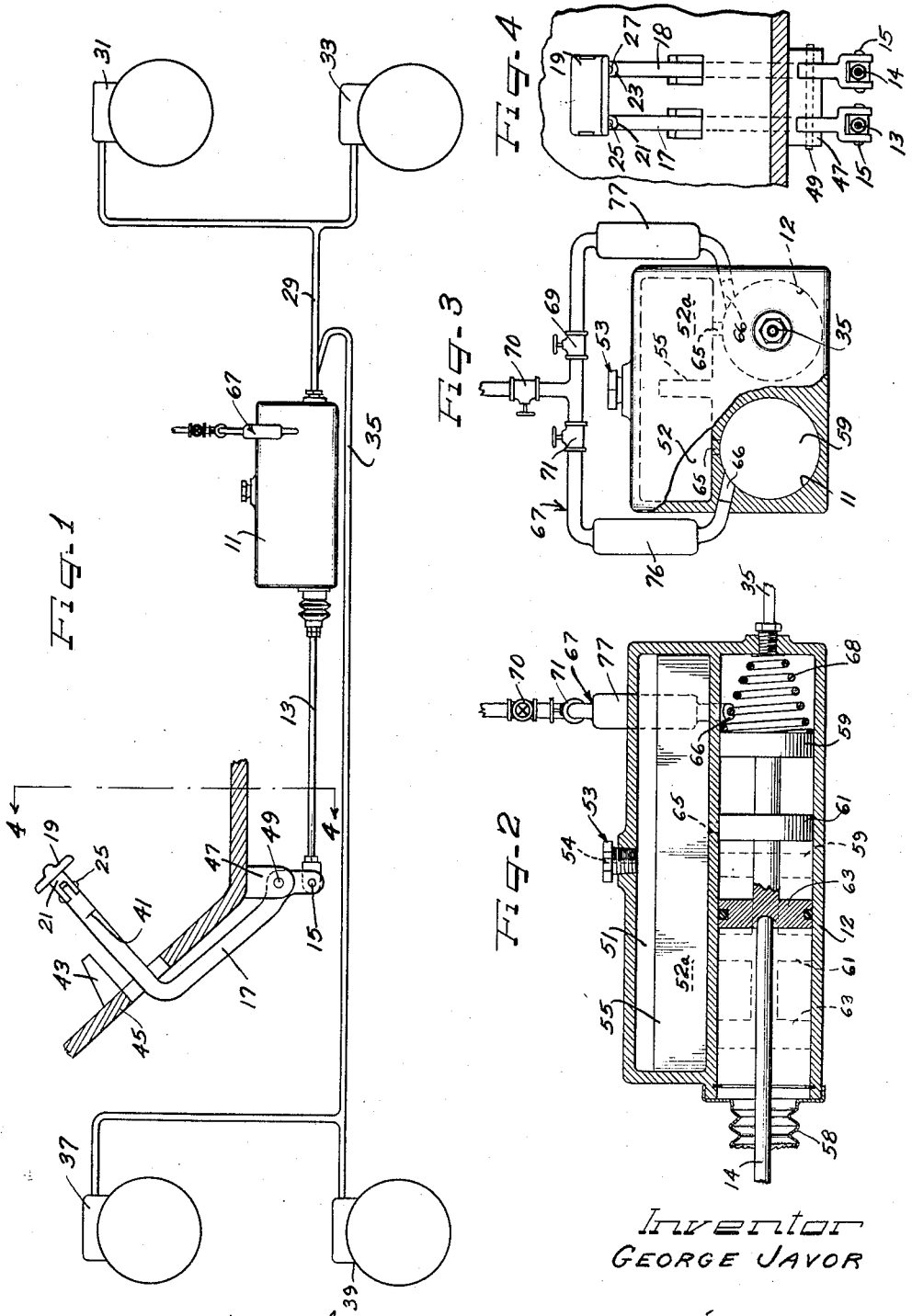

Inventor
GEORGE JAVOR
by Hill, Sherman, Meroni, Gross & Simpson
Attys.

United States Patent Office 2,912,071
Patented Nov. 10, 1959

2,912,071

SAFETY BRAKE CONSTRUCTION

George Javor, Chesterton, Ind.

Application March 28, 1957, Serial No. 649,119

7 Claims. (Cl. 188—152)

This invention relates to a new and improved safety brake construction for automobiles or the like and particularly to a construction including duplicate interconnected master brake cylinders to provide a safety factor in the event of a leak in the system. The invention also includes a new pedal and linkage construction for connecting the pedal to the pistons in the master cylinders.

The standard construction of brakes for automobiles at present in general use comprises a master cylinder, the piston of which is operated by the brake pedal, and hydraulic pressure lines leading from the master cylinder to brake operating cylinders located at the wheels. A reservoir is usually provided at the master cylinder to replace brake fluid lost by gradual leakage. In the event of a major leak in the system, however, the reservoir may soon be exhausted and the brake system rendered inoperative due to lack of fluid.

The present invention contemplates the utilization of a plurality of master cylinders, each independently operating one or more brake cylinders, and wherein fluid from one brake system is automatically transferred to another system to replenish a shortage of fluid therein, such as may be caused by leakage. In addition, the plurality of master cylinders is operated by a single brake pedal which is provided with indicating means for showing when any one master cylinder may be short of fluid.

Accordingly, it is an object of the present invention to provide a new and improved safety automotive hydraulic braking system.

It is a further object to provide such a system in which multiple master cylinders are included, the fluid being transferable therebetween.

It is also an object to provide a brake system including a single brake pedal operating separate levers and linkages connected to separate master cylinders of sub-systems and which pedal indicates excessive leakage in any sub-system.

It is an additional object to provide a construction of this character which provides adequate safety factors in the event of leakage in hydraulic brake lines.

Many other advantages, features and additional objects of the present invention will become manifest to those versed in the art upon making reference to the details of description and the accompanying sheets of drawings, in which structural embodiments incorporating the principles of the present invention are shown by way of illustrative example.

On the drawings:

Figure 1 is a diagrammatic showing of the invention applied to four-wheel brakes;

Figure 2 is a longitudinal section of a master cylinder;

Figure 3 is an end view of a pair of master cylinders, partly in section;

Figure 4 is a fragmentary section taken on line 4—4 of Figure 1;

As shown on the drawings:

Figure 5:
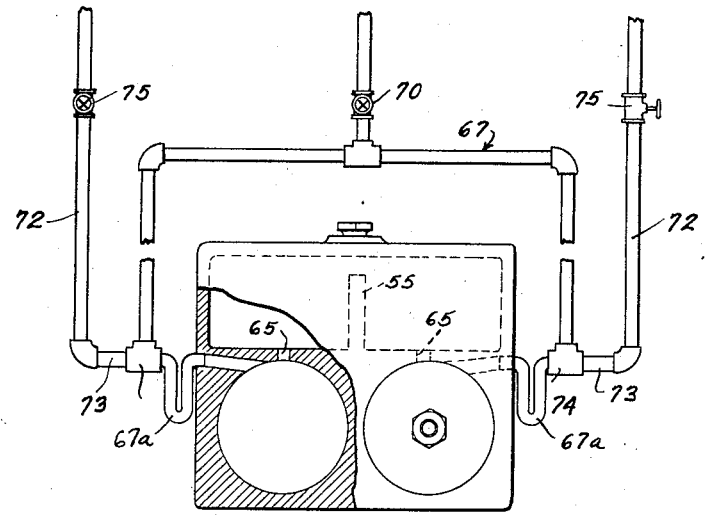
Figure 5 is an end view of a modified form of the invention, partially in section.

In Figure 1, the multiple master cylinders are shown in side view with a piston rod 13 in the near cylinder 11 pivotally connected at 15 to the short arm of a pedal bell crank lever 17. There is a pair of these levers 17 and 18, the lever 18 being connected to a piston rod 14 as shown in section in Figure 4. The pedal 19 has pairs of spaced arms 21 and 23 immediately opposite the foot engaging surface or portion of the pedal and which are pivotally connected by pins 25 and 27 to the bell crank levers 17 and 18. The rear end of the master cylinder 11 is connected by tubing 29 which communicates with a pair of rear brake cylinders 31 and 33. Similarly, the second master cylinder 12 is connected by tubing 35 to a pair of front brake cylinders 37 and 39. In order to indicate a preferred limit of downward movement of pedal 19, an indicator mark 41 may be placed on one or both of bell crank levers 17 and 18. As an alternative and more positive indication, an upstanding indicator lug 43 may be secured to the floor boards 45 adjacent to the pedal. Thus lug 43 would be touched by the foot when the pedal had reached the preferred lower limit of movement. The mark 41 and lug 43 will preferably indicate when the innermost piston 59 has moved past the hole 66 leading to the equalizer system 67. The ball crank levers 17 and 18 are pivotally supported below the floor board 45 on a bracket 47 by pivot pin 49.

Referring now to Figures 2 and 3, Figure 3 is an end view showing both master cylinders 11 and 12, while Figure 2 is a vertical section through the cylinder 12 and the upper center of the reservoir. The cylinder assembly comprises an upper reservoir portion 51 which is shown as located above both cylinders 11 and 12. The reservoir 51 is provided with an opening therein through which it it may be filled with brake fluid with a removable plug 53 acting as a closure for the reservoir, the plug having an air vent 54 therein. A partition 55 divides the reservoir 51 longitudinally so that neither cylinder 11 nor 12 can drain the reservoir entirely in the event of leakage in the braking system or sub-system connected to that cylinder, and in normal operation of the device, the reservoir will retain a reserve supply of fluid. Thus the partition defines a pair of lower reservoir portions 52 and 52a. It is possible to extend partition 55 upwardly so that portions 52 and 52a comprise separate reservoirs or reservoir portions, provided that a removable vented plug 53 is then provided for each portion.

The two cylinders and pistons shown are identical in construction. In Figure 2, the piston rod 14 passes into the cylinder proper through a boot 58 mounted thereon to form a closure for the ends of each of the cylinders 11 and 12. The piston rod 14 carries three pistons 59, 61 and 63. They may be considered as being a single grooved piston. They are shown in full lines in Figure 2, in an actuating position where the piston 59 is applying pressure to the sub-braking system connected to tubing 35. The cylinder 12 is connected to the reservoir 52a by means of a passage 65 having an opening located at an intermediate point in the cylinder. Toward the tubing-end of each master cylinder, the two cylinders are connected at a pair of ports 66, 66 by means of an upwardly extending U-shaped pipe assembly 67 which has various functions, including equalizing the pressure in cylinders 11 and 12. This pipe 67 is provided with a pair of shut-off valves 69 and 71. Between valves 69 and 71 is a T carrying a valve 70 by which fluid may be fed to the system, although its usual purpose, when it is opened, is to bleed air out of the system. Valves 69 and 71 are shown grouped with valve 70. This grouping may be advantageous if access to the valves for manual operation is otherwise difficult. However, the valves 69 and 71 may be located anywhere between the T-connection and cylinders 12 and 11, respectively. If access is not a factor, it would be preferable to locate valves 69 and 71 immediately adjacent to the respective master cylinders. When the pedal is operated to apply brakes, the innermost piston 59 should never, except in the event of an emergency due to leakage, go past the hole 66 leading to the equalizing system.

The location of the three pistons 59, 61 and 63 in their fully retracted position is indicated in broken lines in Figure 2. Their return may be effected by means of spring 68 which is located within the cylinder between piston 59 and the outlet tubing 35. Spring 68 may be located externally of the master cylinder, for example to act on the linkage, provided that a fixed connection is provided between the piston rod 14 and the movable pistons within the cylinder. The innermost or number one piston 59 is located adjacent to the opening to passage 65 from the reservoir so that the tubing end of the cylinder 12 and the brake sub-system connected through tube 35 may be fully filled by fluid from the reservoir. The pipe system 67 is also connected to the pressurizing or tubing-end portion of both cylinders at hole 66. As long as the system including both cylinders is filled with fluid, and with shut-off valve 70 closed and valves 69 and 71 open, there will be a siphon action in pipe assembly 67 to pass fluid from one cylinder to the other if needed in one cylinder and available in the other cylnder. The siphoning rate may be limited, if desired, by partial closing of valve 69 and/or 71. Of course, such siphoning will terminate if the fluid level on opposite sides of partition 55 is equal, and whenever piston 59 has closed passage 65 from ports 66. Since the system normally is used with valves 69 and 71 open, those valves may be omitted in some embodiments. Of course, the pipe system may comprise equivalent passages integral within the master cylinder assembly.

Since the passage 65 communicates or connects the reservoir 52a with the cylinder 12, it may admit fluid between pistons 61 and 63. Piston 63, as shown in solid lines during the actuation stroke, prevents the fluid from escaping through the rod-end of the cylinder.

Referring to Figure 3, it is preferable that the pipe assembly 67 is provided with enlarged standpipe portions 76 and 77 which retain or hold a volume of fluid above the lower level of the reservoir portions 52 and 52a. These standpipes also serve as fluid receivers and as a part of the siphon 67. While it is preferable that there be a substantial volume of fluid stored in the standpipe portions of the siphon, such a volume is not critical for operativeness.

Figure 6:
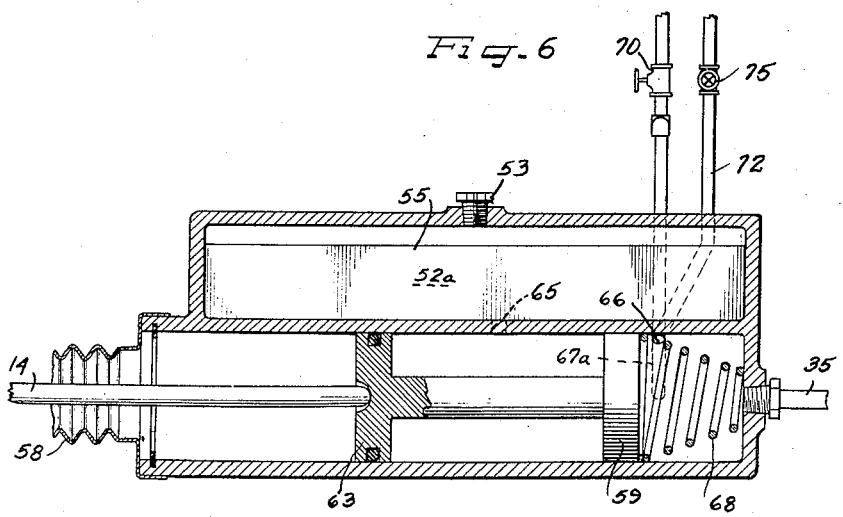
Figure 6 is a longitudinal sectional view of the embodiment shown in Figure 5.

In Figures 5 and 6 the device is shown with auxiliary pipes 72, 72 which are connected into the system 67 by means of nipples 73, 73 and T's 74, 74 with valves 75, 75 being provided by means of which the flow of fluid through the pipes 72, 72 is controlled. The pipes 72, 72 provide means whereby brake fluid can be added to the cylinders at the tubing end, should such addition become necessary, and also provide supplies of brake fluid auxiliary to that carried by the reservoir and system 67 during the operation of the device. The nipples 73, 73 may be connected to the cylinders directly through the upper part of side wall of the cylinders 11 and 12 for the same purpose as that mentioned above.

In the normal operation of the device, the tubing-ends of the cylinders 11 and 12 are filled with fluid; the tubes 29 and 35 and pipes 67 and 72, 72 are also filled with fluid and the reservoir may be either completely or partially filled with fluid.

As the piston rod and pistons are actuated to move pressurizingly in a braking operation, the first or innermost piston 59 will, by a small movement, close off passage 65 from the reservoir so that pressure can be applied to fluid in the tubing-end of the cylinder and, hence, to the braking system through tubing 35. The space between pistons 59 and 61 will normally be filled with fluid through passage 65 as the piston 59 passes beyond the opening 65. Piston 61 prevents fluid in system 67 from returning to the reservoir should piston 59 be beyond the opening 66 in the event of an emergency. As the pistons travel toward the actuating position shown in Figures 2 and 6, pressure will be applied to the operating fluid including the equalizer system and the tubing 29 and 35, and continued pressure will result in the desired braking action.

Should a leak develop in either sub-system, fluid from the non-leaking sub-system will be siphoned through the equalizer system 67 until the fluid levels are substantially equal. However, should such leak continue until sufficient air enters the system 67 to break the fluid column, then the siphon action stops and only the leaking sub-system may drain, leaving sufficient fluid in the other side to operate the brakes sufficiently to stop the vehicle. At any time before or after siphon action has stopped, the shut-off valves may be operated so as to admit air into the upper portion of the system 67. This air then permits the fluid contained in the standpipe portions to drain to the respective cylinders. After the additional reserve fluid contained in equalizer system has been drained into the cylinder and reservoir, preferably the valves should be closed. It can be seen that under this set of conditions, if valve 69 were located immediately adjacent to cylinder 12, fluid could not be forced into the standpipe of the non-leaking sub-system at all. However, if the valves be left open, the capacity of each standpipe is such that fluid displaced by the innermost piston as it moves past opening 65 and up to opening 66 will be received by the standpipe as a receiver, without permitting such fluid to pass through the equalizer system to the other sub-system. Thus, the vertical portions 76 and 77 of the pipes constituting the system 67 preferably have a greater fluid capacity than is the fluid capacity of the cylinders 11 and 12 between the openings 65 and 66 of Figure 2, or in Figure 6 between the opening 65 and the opening 66 and the ends of the pipes 72, 72 in the vertical portions of the pipes constituting the system 67, so in case of a leak in one sub-system to a point where siphoning has stopped, such siphoning will not be reconstituted by forcing brake fluid from the fuller side toward the leaking side of the system.

If desired, only two pistons, such as 59 and 63, and one passage such as 65, may be used in the system. If two pistons are used, then they should be spaced from each other a sufficient distance so that if piston 59 passes well beyond the opening 66, e.g. due to leakage in the system sufficient to permit such piston 59 movement, the piston 63 will not have reached the opening 65, or at least will not have cleared this opening so the reservoir will not be drained of fluid.

In the event of leakage in one of the two cylinders and its associated sub-systems, that piston will move more freely, and consequently, the operator will note this fact because the pedal 19 will tilt laterally downwardly toward the leaking cylinder. This is permitted by the pivoted conections between the pedal and the upper ends of bell crank 17. The indicating mark 41 or the stop plug 43 will indicate to the user when the leakage in the system has reached a danger point. In the event of leakage, the leaking system may be closed off from the other cylinder by closing the valve 69 or valve 71 or both such valves. The division wall 55 in reservoir 51 will prevent a leaking cylinder from robbing the reservoir of all of its fluid.

In the event of leakage in one sub-system, its innermost piston will ultimately move past port 66 upon actuation. The associated sub-system, not having a leakage, will have its innermost piston acting as shown in Figure 2. Thus, when valves 69 and 71 are open or omitted and the siphon is full of fluid, the innermost piston of the non-leaking side will be pressurizing the equalizer 67. Under this condition, the piston 61 of the leaking sub-system is positioned intermediate port 66 and passage 65 whereby it seals against flow from port 66 into the reservoir of the leaking side, while piston 63 continues to seal against leakage through the rod-end of the cylinder.

Once piston 59 has moved past port 66, for example, due to a shortage of fluid, the amount of fluid which piston 59 can thereafter displace into the sub-system is sufficient for complete actuation of that sub-system.

It may be assumed that leakage, in one of the two cylinders of Figures 5 and 6, and its associated sub-system, will develop when valves 70, 75 and 75 are closed. When piston 59 of the non-leaking sub-system has been actuatingly moved past passage 65, it will thereafter, upon further movement, displace fluid into the line 67. When this piston 59 has passed the port 66, actuation of its braking sub-system begins. Simultaneously when the piston 59 has passed the port 66, the fluid in line 67 flows into the space between the pistons 59 and 63. When line 67 has an excess of fluid to fill this space, at least a portion of this excess will be drawn into the cylinder by the piston 59 when it is retractingly moved past the port 66 up to the passage 65 to the reservoir 52a. Preferably the volumetric capacity of the line 67 should be of such magnitude as to minimize the transfer of fluid to the leaking sub-system, and to insure that there will be the above-described excess of fluid during retraction (so that air will not be drawn into the pressurizing end of the cylinder).

As a further means of preventing any drawing of air into the pressurizing end of a cylinder, when the opposite sub-system has a serious leakage, a trap 67a may be provided as shown in Figures 5 and 6 in the equalizer line 67. Thus when the piston 59 has actuatingly passed the port 66, not all of the fluid in line 67 can flow into the space between the pistons 59 and 63 of Figure 6 or pistons 59 and 61 of Figure 2. When the piston 59 is retracted, fluid in the trap 67a, and not air, is drawn into the pressurizing end of the cylinder.

It will be understood that the showings in the drawings are diagrammatic in character. The invention is not limited to two master cylinders, and more may be used. Furthermore, the particular connections from different cylinders to different portions of the braking system may be varied. It is obvious that different cylinders should not actuate brakes on different sides of the car as this might cause dangerous lateral swerving by the car in the event one system fails. One system may be connected to the rear brakes and another to the front wheel brakes or it is now becoming the practice to have two cylinders on each brake assembly and separate brake systems may be connected to different cylinders on all four wheels.

Accordingly, I have provided a master cylinder assembly for a braking system which has a plurality of cylinder assemblies which are connected together. This interconnection is structurally that of a siphon, and it may serve any or all of the following functions: as a pressure equalizer upon actuation, as a fluid level equalizer upon a difference in fluid level occurring, as means for providing an additional reserve supply of fluid, as a receiver of fluid being displaced by the piston, as a means for refilling the brake system, and as a means for bleeding the master cylinder.

It is to be understood that the novel pedal 19 and the system 67 each perform an equalizing function. Accordingly, it is to be understood that either or both of these features may be incorporated in various embodiments of my invention.

Although various minor modifications might be suggested by those versed in the art, it should be understood that I wish to embody within the scope of the patent warranted hereon, all such embodiments as reasonably and properly come within the scope of my contribution to the art.

I claim as my invention:

1. In a fluid pressure braking system, a pair of master cylinders; a plurality of brake operating cylinders; means connecting each of the master cylinders and certain of the brake cylinders for leading fluid under pressure thereto; piston rods extending from within said master cylinders; a separate brake lever and linkage connected to each piston rod, the brake levers having upper ends located side by side; a common brake pedal having a foot engaging portion; and a pair of pivot pins connecting said portion to each of said upper ends of the brake levers in such manner that the pedal will without disconnection from either of said levers, tilt downwardly toward a lever which moves downwardly a greater distance than the adjacent lever due to fluid leakage from one of said master cylinders while actuating the adjacent lever.

2. In a fluid pressure braking system, a pair of master cylinders; a reservoir positioned above said master cylinders and having a pair of separate portions, each of said portions being connected to one of said cylinders by a passage; a plurality of brake operating cylinders; means connecting each of the master cylinders and certain of the brake cylinders for leading fluid under pressure thereto; piston rods extending from within said master cylinders; a brake pedal and connecting levers and linkages for jointly moving said piston rods; said master cylinders each including three axially spaced relatively fixed pistons actuated by each piston rod in its cylinder, a first innermost piston of said pistons serving to place the brake fluid under pressure by passing the opening to said passage during actuation of said rod; a second of said pistons spaced from said first piston and toward said rod as a seal; the walls of said master cylinders each having a port therein located between the first piston and said connecting means when the piston rod is in the normal actuating position; and siphon means connecting said ports in the two cylinders for equalizing reservoir fluid level and operating cylinder pressure during normal operation thereof; said means including an enlarged receiver standpipe for holding a reserve supply of fluid positioned above one of said ports and having a fluid capacity greater than the cylinder volume between the retracted piston and said connecting means, whereby upon admission of air to said siphon, fluid in said standpipe will enter one of said master cylinders and its associated reservoir portion; a third of said pistons spaced from said second piston toward said rod as a seal; whereby should said innermost piston pass said port, said second piston prevents venting of said port to said reservoir, and said third piston prevents venting of said passage to said rod.

3. In a fluid pressure braking system, a pair of master cylinders; a plurality of brake operating cylinders; means connecting each of the master cylinders and certain of the brake cylinders for leading fluid under pressure thereto; piston rods extending from within said master cylinders; a separate brake lever and linkage connected to each piston rod, the brake levers having upper ends located side by side; a common brake pedal having a foot-engaging portion; a pair of pivot pins connecting said portion to each of said upper ends of the brake levers in such a manner that the pedal will, without disconnection from either of said levers, tilt downwardly toward a lever which moves downwardly a greater distance than the adjacent lever due to fluid leakage from one of said master cylinders while actuating the adjacent lever; and low fluid warning means comprising a stationary indicator fixedly supported separate from but adjacent to said foot-engaging portion of said pedal to be engaged by the operator's foot before the pedal has bottomed to indicate when at least one of said master cylinders allows the brake pedal to be depressed below a predetermined point.

4. In a fluid braking system, including a master cylinder, a brake operating cylinder, means connecting the master cylinder and the brake cylinder for leading fluid under pressure thereto, a piston rod extending from within the master cylinder, a brake pedal, and means connecting the piston rod and the brake pedal, the improvement comprising: a low fluid warning means comprising a stationary indicator fixedly supported separate from but adjacent to said pedal to be engaged by the operator's foot before the pedal has bottomed to indicate when the master cylinder allows the brake pedal to be depressed below a predetermined point.

5. In a fluid pressure braking system, a pair of master cylinders; a reservoir positioned above said master cylinders and having a pair of separate portions, each of said portions being connected to one of said cylinders by a passage; a plurality of brake operating cylinders; means connecting each of the master cylinders and certain of the brake cylinders for leading fluid under pressure thereto; piston rods extending from within said master cylinders; a brake pedal and connecting levers and linkages for jointly moving said piston rods; said master cylinders each having a piston for serving to place the brake fluid under pressure by passing the opening to said passage during actuation of said rod; the walls of said master cylinder each having a port therein located between the piston and said connecting means when the piston rod is in the normal actuating position; and siphon means connecting said ports in the two cylinders for equalizing reservoir fluid level and operating cylinder pressure during normal operation thereof; said means including an enlarged receiver standpipe for holding a reserve supply of fluid positioned above one of said ports and having a fluid capacity greater than the cylinder volume between the retracted piston and said connecting means, whereby upon admission of air to said siphon, fluid in said standpipe will enter one of said master cylinders and its associated reservoir portion.

6. In a fluid pressure braking system, a pair of master cylinders; a reservoir positioned above said master cylinders and having a pair of separate portions, each of said portions being connected to one of said cylinders by a passage; a plurality of brake operating cylinders; means connecting each of the master cylinders and certain of the brake cylinders for leading fluid under pressure thereto; piston rods extending from within said master cylinders; a brake pedal and connecting levers and linkages for jointly moving said piston rods; said master cylinders each having a piston for serving to place the brake fluid under pressure by passing the opening to said passage during actuation of said rod; the walls of said master cylinder each having a port therein located between the piston and said connecting means when the piston rod is in the normal actuating position; and means connecting said ports in the two cylinders for equalizing reservoir fluid level and operating cylinder pressure during normal operation thereof; said means including an enlarged receiver standpipe for holding a reserve supply of fluid positioned above one of said ports and having a fluid capacity greater than the cylinder volume between the retracted piston and said connecting means, and also including a downwardly directed trap intermediate one of said ports and said standpipe, whereby upon admission of air to said siphon, fluid in said standpipe will enter one of said master cylinders and its associated reservoir portion.

7. In a fluid pressure braking system, a pair of master cylinders; a reservoir positioned above said master cylinders and having a pair of separate portions, each of said portions being connected to one of said cylinders by a passage; a plurality of brake operating cylinders; means connecting each of the master cylinders and certain of the brake cylinders for leading fluid under pressure thereto; piston rods extending from within said master cylinders; a brake pedal and connecting levers and linkages for jointly moving said piston rods; said master cylinders each having a piston for serving to place the brake fluid under pressure by passing the opening to said passage during actuation of said rod; the walls of said master cylinder each having a port therein located between the piston and said connecting means when the piston rod is in the normal actuating position; means connecting said ports in the two cylinders for equalizing reservoir fluid level and operating cylinder pressure during normal operation thereof; said means including an enlarged receiver standpipe for holding a reserve supply of fluid positioned above one of said ports and having a fluid capacity greater than the cylinder volume between the retracted piston and said connecting means, whereby upon admission of air to said siphon, fluid in said standpipe will enter one of said master cylinders and its associated reservoir portion; and a valve disposed in said port-connecting means for blocking flow of such air.

References Cited in the file of this patent

UNITED STATES PATENTS

| | | |
|---|---|---|
| 2,195,558 | Bowen | Apr. 2, 1940 |
| 2,201,086 | Guderian | May 14, 1940 |
| 2,324,007 | MacPherson | July 13, 1943 |
| 2,443,331 | Stewart | June 15, 1948 |